United States Patent [19]

Hanyu et al.

[11] Patent Number: 5,047,852

[45] Date of Patent: Sep. 10, 1991

[54] ADAPTIVE TRANSFORM ENCODER FOR DIGITAL IMAGE SIGNAL IN RECORDING/REPRODUCING APPARATUS

[75] Inventors: Hiroyuki Hanyu, Katsuta; Nobukazu Doi, Hachioji; Seiichi Mita, Kanagawa; Morishi Izumita, Inagi; Yoshizumi Eto, Sagamihara, all of Japan

[73] Assignee: Hitachi, Ltd., Tokyo, Japan

[21] Appl. No.: 375,727

[22] Filed: Jul. 5, 1989

[30] Foreign Application Priority Data

Jul. 22, 1988 [JP] Japan .................. 63-181901

[51] Int. Cl.$^5$ .................. H04N 7/12; H04N 7/04; H04N 5/95
[52] U.S. Cl. .................. 358/133; 350/141; 350/339; 375/25
[58] Field of Search .............. 358/133, 137, 141, 339, 358/12, 426, 430, 431; 375/25, 122, 121; 364/725; 360/32, 48, 10.1; 381/31, 51

[56] References Cited

U.S. PATENT DOCUMENTS

| | | | |
|---|---|---|---|
| 3,984,626 | 10/1976 | Mounts et al. | 358/133 |
| 4,535,472 | 8/1985 | Tomcik | 375/122 |
| 4,757,383 | 7/1988 | Tanaka | 358/133 |
| 4,805,030 | 2/1989 | Tanaka | 358/133 |

OTHER PUBLICATIONS

"Adaptive Vector Quantization of Picture Signals in Discrete Iosine Transform Domain"; Aizawa et al.; Papers of the Institute of Electronics and Communication Engineers of Japan; Mar. 1986; vol. J69-B, No. 3; pp. 228-236.

"Adaptive Cooling of Monochrome and Color Images"; W. Chen et al.; IEEE Transactions on Communications; vol. COM-25, No. 11; Nov. 1977; pp. 1285-1292.

Primary Examiner—John K. Peng
Attorney, Agent, or Firm—Antonelli, Terry, Stout & Kraus

[57] ABSTRACT

An adaptive transform encoder can keep a recording rate of a digital signal at a constant level. It comprises a unit for orthogonal-transforming one block of digital input signal, a unit for calculating an activity index of the orthogonal-transformed block, a unit for comparing the activity index of the block with a predetermined reference, a unit for classifying the block to a standard bit class having a predetermined number of bits when the activity index of the block is equal to the reference, classifying the block to a low bit class having a smaller number of bits than the predetermined number of bits of the standard bit class when the activity index of the block is smaller than the reference, and classifying the block to a high bit class having a larger number of bits than the predetermined number of bits of the standard bit class when the activity index is larger than the reference, a quantization unit for quantizing the input signal of the block with the number of bits designated by the bit class, a unit for selecting the block of the low bit class from the quantized blocks, an allocation unit for adding to the selected block of the low bit class the data having more bits than the number of bits of the standard bit class of the block of the quantized high bit class, and an encoder unit for encoding the quantized block signal.

8 Claims, 6 Drawing Sheets

FIG. 5A  DC COMPONENT — $i$ → HIGHER FREQUENCY

BIT ALLOCATION OF LOW BIT CLASS $j$ ↓ HIGHER FREQUENCY

| 8 | 2 | 0 | 0 | 0 | 0 | 0 | 0 |
|---|---|---|---|---|---|---|---|
| 3 | 2 | 1 | 2 | 1 | 0 | 0 | 0 |
| 2 | 2 | 1 | 0 | 0 | 0 | 0 | 0 |
| 2 | 2 | 0 | 2 | 2 | 0 | 0 | 0 |
| 2 | 1 | 0 | 0 | 0 | 0 | 0 | 0 |
| 1 | 2 | 0 | 2 | 2 | 1 | 0 | 0 |
| 0 | 1 | 0 | 2 | 2 | 0 | 0 | 0 |
| 0 | 3 | 0 | 4 | 4 | 3 | 0 | 0 |

FIG. 5B

BIT ALLOCATION OF STANDARD BIT CLASS

| 8 | 3 | 2 | 2 | 1 | 0 | 0 | 0 |
|---|---|---|---|---|---|---|---|
| 4 | 3 | 3 | 3 | 2 | 2 | 0 | 0 |
| 3 | 3 | 2 | 2 | 2 | 1 | 0 | 0 |
| 3 | 3 | 2 | 3 | 3 | 2 | 0 | 0 |
| 3 | 3 | 2 | 2 | 2 | 1 | 0 | 0 |
| 2 | 3 | 2 | 3 | 3 | 2 | 0 | 0 |
| 2 | 2 | 2 | 3 | 3 | 2 | 0 | 0 |
| 2 | 4 | 2 | 5 | 5 | 4 | 0 | 0 |

FIG. 5C

BIT ALLOCATION OF HIGH BIT CLASS

| 8 | 4 | 3 | 3 | 2 | 2 | 1 | 0 |
|---|---|---|---|---|---|---|---|
| 5 | 4 | 4 | 4 | 3 | 3 | 2 | 0 |
| 4 | 4 | 3 | 3 | 3 | 2 | 2 | 0 |
| 4 | 4 | 3 | 4 | 4 | 3 | 2 | 0 |
| 4 | 3 | 3 | 3 | 3 | 2 | 2 | 0 |
| 3 | 4 | 3 | 4 | 4 | 3 | 2 | 0 |
| 3 | 3 | 3 | 4 | 4 | 3 | 2 | 0 |
| 3 | 5 | 3 | 6 | 6 | 5 | 2 | 2 |

~50

ADAPTIVE TRANSFORM ENCODER FOR DIGITAL IMAGE SIGNAL IN RECORDING/REPRODUCING APPARATUS

BACKGROUND OF THE INVENTION

The present invention relates to an adaptive transform encoder for an image signal, and more particularly to an adaptive transform encoder suitable for use with a recording/reproducing apparatus Data compression methods for a television signal includes transform encoding in which a frame is divided into blocks each comprising a plurality of pixels, orthogonal transform is performed for each block and transform coefficients thereof are encoded. In this transform encoding, in order to improve the data compression efficiency, an adaptive transform encoding method has been proposed in which assignment of a quantization bit for each block is changed in accordance with a frequency component of the image. An example of the adaptive transform encoding method is described in IEEE Trans. Commun. COM 25, 11 (1977), pp. 1285-1292 (Reference 1), in which a two-dimensional discrete cosine transform is used as as two-dimensional orthogonal transform. The two-dimensional discrete cosine transform and inverse transform are shown in formulas (1) and (2) of Papers of The Institute of Electronics and Communication Engineers of Japan, March 1986, Vol. J69-B, No. 3, pp. 228-236 (Reference 2).

The adaptive transform encoding method which uses the two-dimensional discrete cosine transform is briefly explained.

As shown in FIG. 1, the active picture 14 of one field is divided into blocks 15 comprising N (scanning lines)×N (pixels), and the two-dimensional discrete cosine transform is performed for each block. When an input is given by f(i, j) and a transform coefficient is given by F(u, v), the two-dimensional discrete cosine transform is given by the following expression, where i and j are two-dimensional coordinates of the pixels in the block;

$$F(u,v) = 4C(u)C(v)/N^2 \times \sum_{i=0}^{N-1} \sum_{j=0}^{N-1} f(i,j) \cdot \cos[(2i+1)u\pi/2N] \cdot \cos[(2j+1)v\pi/2N] \quad (1)$$

$$u, v = 0, 1 \ldots, N-1$$

where $$C(w) = 1/\sqrt{2} \quad (w = 0)$$
$$C(w) = 1 \quad (w \neq 0)$$

The inverse transform is given by the following expression;

$$f(i,j) = \sum_{i=0}^{N-1} \sum_{j=0}^{N-1} C(u)C(v)F(u,v) \cdot \cos[(2i+1)u\pi/2N] \cdot \cos[(2j+1)v\pi/2N] \quad (2)$$

$$i, j = 0, 1 \ldots, N-1$$

As to the transform coefficients F(u, v), F(0, 0) represents a DC component and others represent AC components. An activity index A is defined by a sum of powers of the AC components. Namely, the activity index is given by the following expression, (The activity index A corresponds to the formula (7) on page 1287 of the Reference 2);

$$A = \sum_{i=0}^{N-1} \sum_{j=0}^{N-1} F(i,j)^2 \quad (3)$$

$$(i, j) \neq (0, 0)$$

A threshold is set for the activity index A and the blocks are classified by the magnitudes of the activity index and the threshold of each block. Quantizers of different numbers of bits are provided one for each class. Usually, the quantizer is a linear quantizer for the DC component, and a non-linear quantizer for the AC component. A block having a small activity index is quantized with a small number of bits, and a block having a large activity index is quantized with a large number of bits. As a result, an encoding which conforms to a local change of the image can be attained and the compression efficiency is improved.

The activity index varies with the picture pattern of the block. A block which includes many high frequency components has a large activity index. In the prior art mentioned above, the number of bits needed changes with the picture pattern because the assignment of the quantization bits is adaptively changed with the activity index of each block. The block having a fine picture pattern which has a large activity index requires a large number of bits, and the block having a picture pattern which results in a small activity index (for example, background having small two-dimensional change) requires a smaller number of bits.

Digital signals can be recorded by tape recorders and the like. However, the tape running speed or rotation speed of head cylinder can not be easily changed momentarily in the tape recorders and the like. Accordingly, it is very difficult for the digital tape recorder and the like to record signals with a recording rate which always changes.

SUMMARY OF THE INVENTION

It is an object of the present invention to provide an adaptive transform encoder which may maintain a constant recording rate.

In order to achieve the above object, the adaptive transform encoder of the present invention comprises a unit for orthogonal-transforming one block of a digital input signal, a unit for calculating an activity index of the orthogonal-transformed block, a unit for comparing the activity index of the block with a predetermined reference, a unit for classifying the block to a standard bit class having a predetermined number of bits when the activity index of the block is equal to the reference, classifying the block to a low bit class having a smaller number of bits than the predetermined number of bits of the standard bit class when the activity index of the block is smaller than the reference, and classifying the block to a high bit class having a larger number of bits than the predetermined number of bits of the standard bit class when the activity index is larger than the reference, a quantization unit for quantizing the input signal of the block with the number of bits designated by the bit class, a unit for selecting the block of the low bit class from the quantized blocks, an allocation unit for adding to the selected block of the low bit class the data having more bits than the number of bits of the standard bit class of the block of the quantized high bit class, and an encoder unit for encoding the quantized block signal.

BRIEF DESCRIPTION OF THE DRAWINGS

FIGS. 5A-5C illustrate bit allocation of each class.

DESCRIPTION OF THE PREFERRED EMBODIMENT

Figure 3:
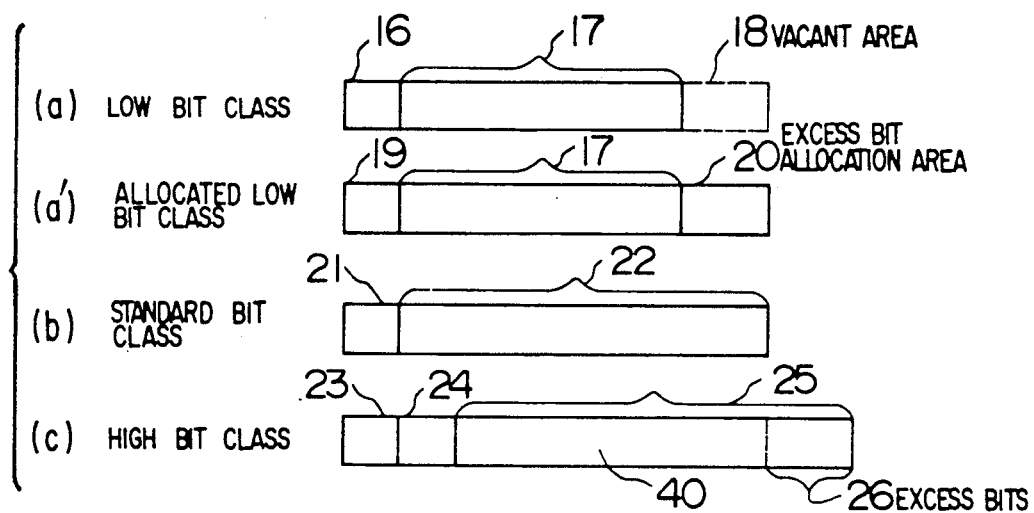
FIG. 3 shows a bit structure of each class when the number of classes is three.

An activity index is calculated for each block of the input digital signal and is compared with a preset threshold. Depending on the comparison result, it is classified into one of three classes, standard bit class, high bit class and low bit class (more than three classes may be used.) FIG. 3 shows a bit configuration for the respective classes, where FIG. 3(a) is for the low bit class, FIG. 3(b) is for the standard class and FIG. 3(c) is for the high bit class. The low bit class (a) includes a vacant area 28 which does not reach the standard number of bits. On the other hand, the high bit class includes excess bits 26 which are beyond the standard number of bits. The number of bits of the respective classes are preselected such that the number of bits in the vacant area 18 and the number of excess bits 26 are equal.

Figure 4:
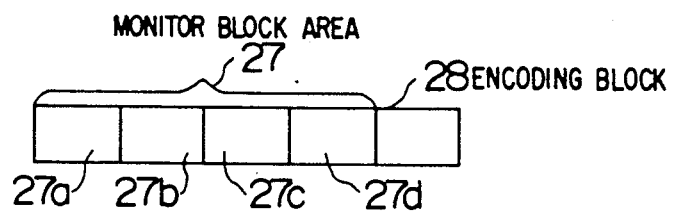
FIG. 4 shows a first example of a monitor block area.

Here an encoding block and a monitor block area are defined. The encoding block points to a block which is to be classified into one of (a) low bit class (b) standard bit class and (c) high bit class and to be quantized. The monitor block area comprises a plurality quantized blocks. FIG. 4 shows a relationship between the encoding block 28 and the monitor block area 27. The quantization operation is now explained.

Where the encoding block 28 has been classified into the low bit class owing to the activity index, it is quantized with a predetermined number of bits 17 and a class bit 16 for indicating the low bit class is added. If it has been classified into the standard bit class, it is quantized with a predetermined number of bits 22 and a class bit 21 for indicating the standard bit class is added. If it has been classified into the high bit class and if there is a block of the low bit class (c) in the encoded blocks 27a, 27b, 27c and 27d in the monitor block area 27, it is quantized with the number of bits 25 predetermined for the high bit class (c), the excess bits 26 are allocated to the vacant area 18 in the low bit class in the monitor block area 27, and a class bit 23 for indicating the high bit class and an address bit 24 for indicating the position of the low bit class to which the excess bits have been allocated are added. The class bit 16 for the low bit class to which the excess bits have been added is changed to a class bit 19 to indicate the completion of the allocation of the excess bits. If there is no low bit class (a) in the monitor block area, the encoding block is regarded as the standard bit class (b) and it is encoded. In this manner, the recording rate can be kept constant in spite of the adaptive encoding.

In decoding, it is classified by the class bit 16, 19, 21 or 23 added to the class. If it is the low bit class (a), it is decoded by the predesignated quantization bits. If it is the standard bit class (b), it is decoded by the predesignated quantization bits 22. If it is high bit class (c), it is decoded by the predesignated quantization bits 40 and the excess bits 20 allocated to the low bit class designated by the address bit 24.

The present invention is now explained in detail with reference to the drawings.

Figure 2:
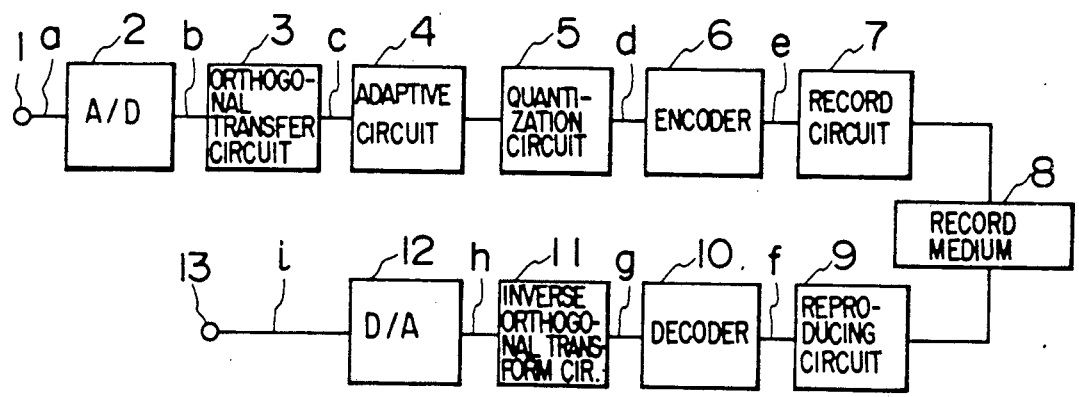
FIG. 2 shows a block diagram of one embodiment of a system which is a combination of the adaptive transform encoder of the present invention and a recording-/reproducing apparatus.

FIG. 2 shows a block diagram of one embodiment. A television signal a applied to an input terminal 1 is converted to an 8-bit digital signal b by an A/D converter 2. It is orthogonal-transformed, such as by discrete cosine transform, by an orthogonal transform circuit 3 to produce a transform coefficient c. An activity index for each block is calculated by an adaptive circuit 4 and is compared with a predetermined threshold to classify the block. The block is quantized by a quantization circuit 5 in accordance with the bit allocation of the class. An encoder 6 converts it to a code e corresponding to the input signal level d. A recording circuit 7 records the data e on a record medium 8, such as a magnetic tape. In reproducing the recorded data, an output signal f from a reproducing circuit 9 is supplied to a decoder 10 to produce a representative value g corresponding to the encoder 6. It is inverse-transformed by a inverse orthogonal transform circuit 11, which is functionally inverse to the orthogonal transform circuit 3, to produce an output signal h. This is converted into an analog signal by a D/A converter 12 to produce a television signal i at an output terminal 13.

Figure 1:
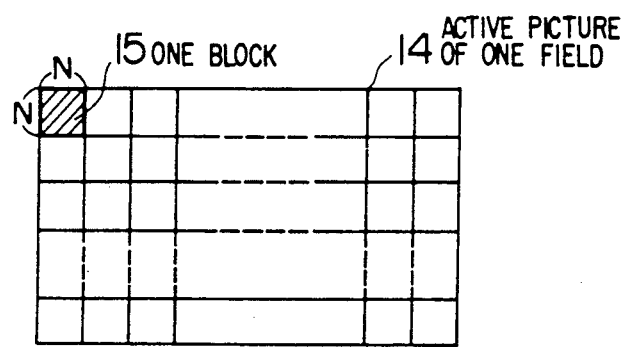
FIG. 1 illustrates block division of a screen.

As an example, it is assumed that an NTSC color television signal sampled at $4 \times f_{sc} = 14.3$ MHz (where $f_{sc}$ is a color sub-carrier frequency) is encoded by 2 bits per pixel in average by the two-dimensional discrete cosine transform. As shown in FIG. 1, the active picture screen 14 of one field is divided into $96 \times 30$ blocks to define encoding blocks 15 each comprising 8 scanning lines $\times$ 8 pixels. The two-dimensional discrete cosine transform is applied to the input data $f(i, j)$ for each encoding block to produce 64 transform coefficients $F(i, j)$ in total. An example of bit allocation when the block is classified into one of the three classes, i.e. a low bit class, a standard bit class and a high bit class is shown in FIGS. 5A-5C. FIG. 5A shows the bit allocation of 64 bits corresponding to the low bit class, FIG. 5B shows the bit allocation of 128 bits corresponding to the standard bit class, and FIG. 5C shows the bit allocation of 192 bits corresponding to the high bit class. The total number of bits in each class includes two bits for indicating the class. In any case, 8 bits are allocated to a DC component m (0, 0) because it significantly influences the image quality. The other bit allocation to the respective components is done in accordance with the optimum bit allocation method expressed by $$M = \sum_{i=0}^{7} \sum_{j=0}^{7} m(i, j)$$

$$m(i, j) = M/64 + 2 \text{LOG}_{10} \sigma^2 (m(i,j)) / \left[ \prod_{i=0}^{7} \prod_{j=0}^{7} \sigma^2(m(i,j)) \right]^{1/64}$$

where $o^2(m(i,j))$ is a mean power of the transform coefficients, M is the total number of bits per block and $m(i, j)$ is the number of bits allocated to each transform coefficient. In the bit allocation shown by FIG. 5C of the high bit class, the bits 50 and selected to be allocated to the low bit class. The bits 50 are components of a small number of bits which do not significantly affect the quality of the reproduced image.

Figure 6:
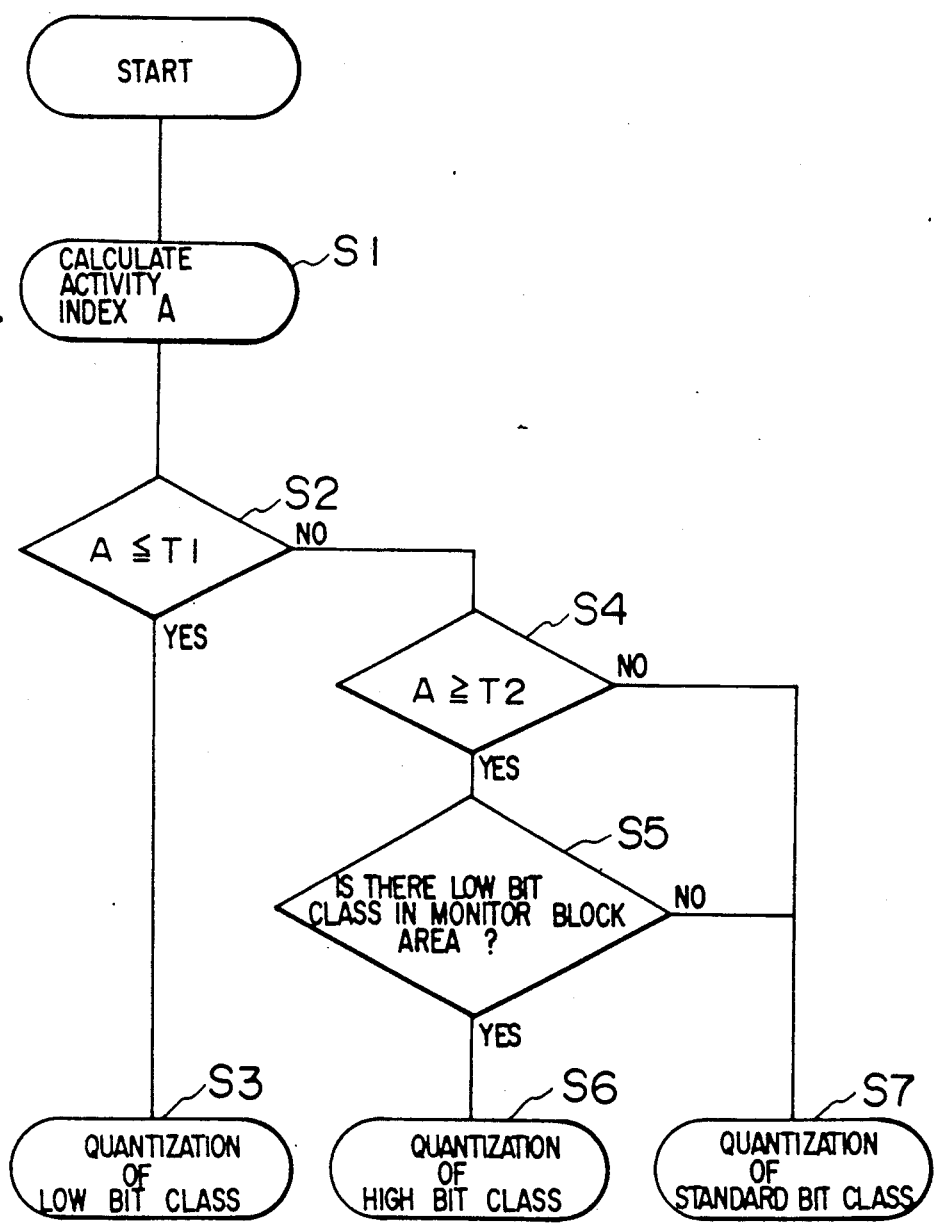
FIG. 6 shows a flow chart of an adaptive transform encoder.
Figure 7:
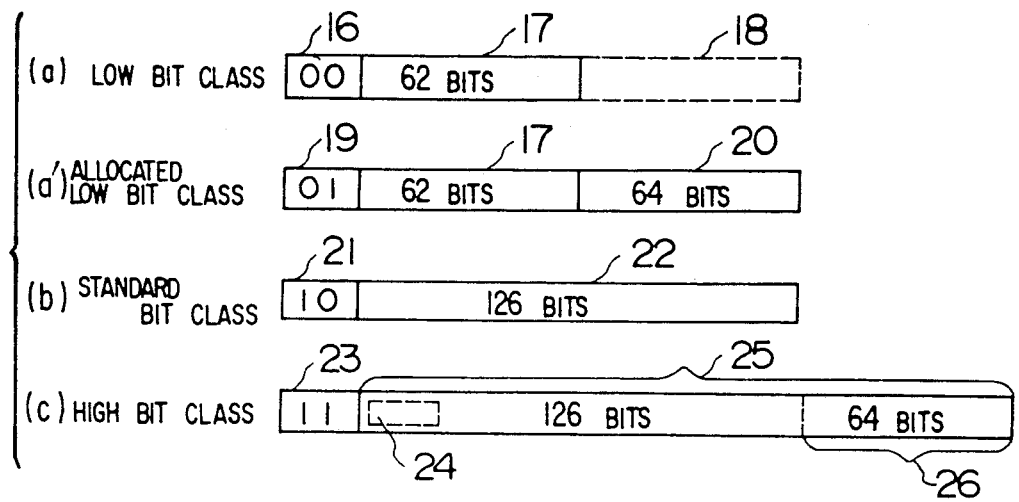
FIG. 7 shows an example of a bit configuration of each class.
Figure 10:
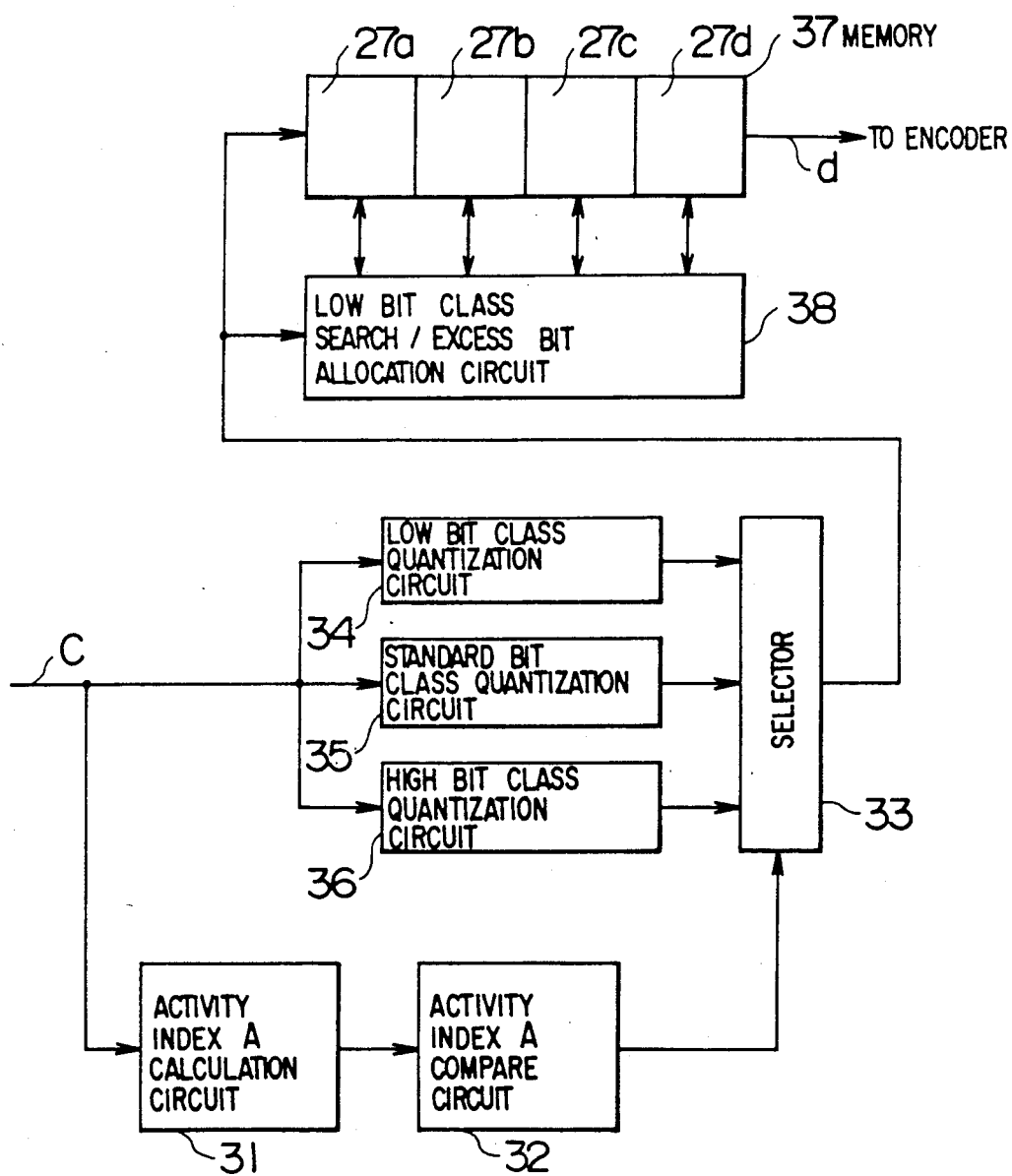
FIG. 10 shows a block diagram of an adaptive circuit 4 and a quantization circuit 5 of FIG. 1.

The operation of the adaptive circuit 4 and the quantization circuit 5 of FIG. 2 is now explained with reference to a block diagram of FIG. 10 which shows the adaptive circuit 4 and the quantization circuit 5 in detail, a flow chart of FIG. 6 and a bit structure of FIG. 7. First, for each block, an activity index A is calculated based on a transform coefficient C by an activity index A calculation circuit 31 (step S1). Assuming that the block is to be classified into one of three classes, the activity index A is compared with two preset thresholds $\tau1$ and $\tau2$ ($\tau1 < \tau2$) by an activity index A comparator 32. The thresholds $\tau1$ and $\tau2$ are selected such that the number of low bit classes and the number of high bit classes are equal. In the present instance, $\tau1$ is 300 and $\tau2$ is 500. Whether or not the resulting activity index A is no larger than T1 ($A \leq T1$) is checked (step S2). If the decision is yes, the 62-bit quantization bits 17 quantized by a low bit class quantization circuit 34 and the class bit 16 are selected by a selector 33 (step S3). If the decision is no, whether or not A is no smaller than T2 ($A \geq T2$) is checked (step S4). If the decision is no, the 126-bit quantization bits 17 quantized by a standard bit class quantization circuit 35 and the class bit 21 are selected by the selector 33 (step S7). If the decision is yes, whether or not the vacant area 18 in the encoded blocks 278a, 27b, 27c and 27d in a memory 37 which constitute the monitor block area is an unused low bit class is checked by a low bit class search/excess bit allocation circuit 38 (step S5). If the decision is yes, the 190-bit quantization bits 25 quantized by the high bit class quantization circuit 36 and the class bit 23 are selected by the selector 33, and the 64-bit excess bits 26 are allocated to the vacant area 18 of the low bit class in the encoded block 27a, 27b, 27c or 27d in the memory 37 by the low bit class search/excess bit allocation circuit 38. The address bit 24 for indicating the position of the low bit class to which the excess bit have been allocated is added thereto, and the class bits 19 for the low bit class are changed to the bits "01" 19 which indicate the used status of the vacant area 18 (step S6). If the decision is no, the quantization bits 17 quantized by a standard bit class quantization circuit 35 and the class bits are selected by the selector 33 (step S7). Since the quantization is effected with 126 bits 22, all classes comprise 128 bits and the recording rate can be kept constant at 2 bits per pixel in average.

Figure 8:
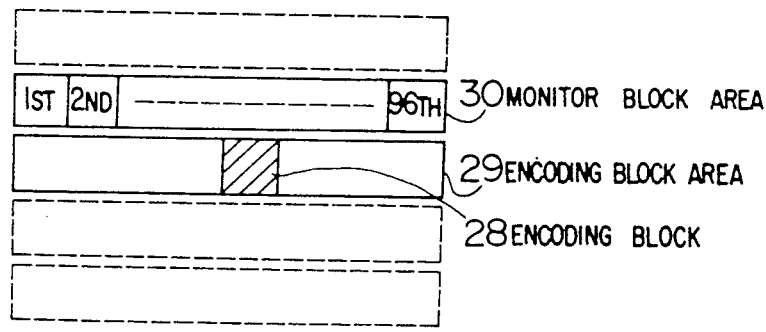
FIG. 8 shows a second example of the monitor block area.

FIG. 8 shows the monitor block area used in the embodiment. The monitor block area 30 is one block before an encoding block area 29 which includes the block currently being encoded. The monitor block area comprises 96 blocks. If a relationship between the high bit class and the low bit class is to be designated by an address, 7 bits ($\log_2 96 = 6.58$) are required for the address bits 24. However, the 7-bit address bits may be omitted by correlating the low bit classes of the encoding block area 29 to the high bit classes of the monitor block area 30 sequentially starting from a smaller high bit class number.

In the normal decoding, the bits allocated to the low bit class can be reallocated to the original high bit class. However, in case of error or in the variable speed reproducing, the low bit class may not be reproduced and the bits allocated to the low bit class cannot be reallocated to the high bit class. As a result, the image quality is deteriorated. By selecting a non-significant component in sense of sight excluding low frequency components and color components such as the area 50 in FIG. 5C as the bits to be allocated to the low bit class, a high quality image can be reproduced even if the low bit class is not reproduced.

A result of computer simulation under the above conditions is shown in the Table below. The image used is a girl with a carnation which is a standard image of The Institute of The Television Engineers of Japan. SNR is expressed by $$SNR = 20 \times LOG_{10} (255 / \sqrt{(Y_i - X_i)^2 / N})$$

where Xi (i=1, ... N, N: number of data) is a signal train of an original image, and Yi (i=1, ... N) is a signal train after transform.

TABLE

|  | SNR (dB) |
|---|---|
| No adaptation | 34.69 |
| With adaptation | 37.58 |

It is seen from the Table that the SN ratio was improved by approximately 3 (dB) by the adaptation while using a fixed compression factor, compared to a case where the two-dimensional discrete cosine transform was applied without adaptation.

Figure 9:
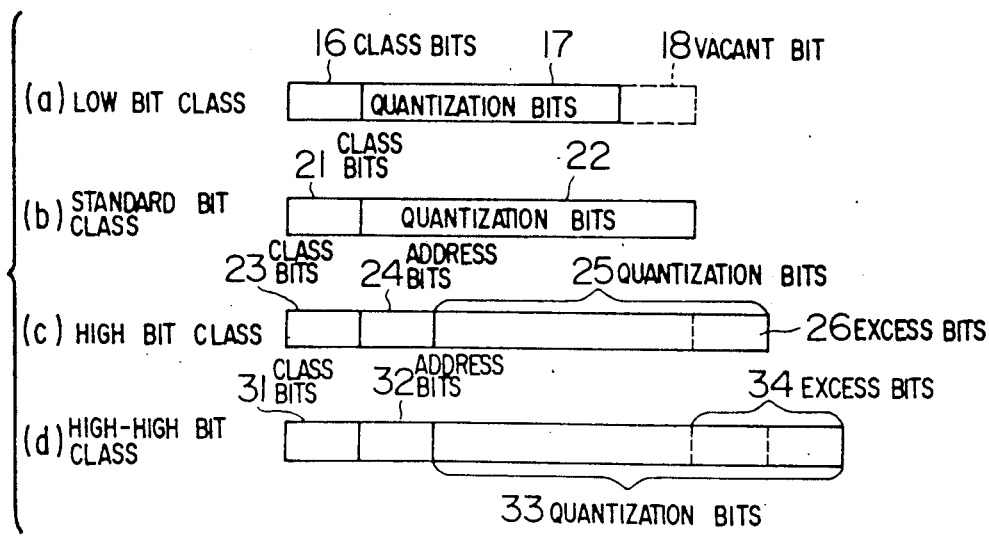
FIG. 9 shows a bit structure for each class when the number of classes is four.

In the above embodiment, three classes are used. The number of classes may be increased. FIG. 9 shows the bit structures of the classes when four classes are used. The low bit class (a), the standard bit class (b) and the high bit class (c) are the same as those of FIGS. 3A–3C and hence an explanation thereof is omitted. A high-high bit class (d) includes class bits 31 and excess bits 34. It comprises the address 32 which designates one of two low bit class blocks and the quantization bits 33. As stated above, the excess bits 26 of the high bit class (c) are allocated to one of the low bit class vacant areas 18. On the other hand, the excess bits 34 of the high-high bit class (d) are allocated to two low bit class vacant areas 18. By configuring the bits of the respective classes in the manner described above, the same function is attained with the four classes as that attained with the three classes. The same is true where five or more classes are used.

As described hereinabove, in accordance with the present invention, the compression efficiency is improved and the recording data rate is maintained constant. Thus, the adaptive transform encoding suitable for a recording apparatus, such as the digital VTR and the like, is attained.

We claim:

1. An adaptive transform encoder for processing continuous digital signals for each fixed block, comprising:

means for orthogonal-transforming one block of digital input signals;

means for calculating an activity index of the orthogonal-transformed block;

means for comparing the activity index of the block with a predetermined reference and for classifying the block to a standard bit class having a predetermined number of bits when the activity index of the block is equal to the reference, classifying the block to at least one low bit class having a smaller number of bits than the predetermined number of bits of the standard bit class when the activity index of the block is smaller than the reference, and for classifying the block to at least one high bit class having a larger number of bits than the predetermined number of bits of the standard bit class when the activity index of the block is larger than the reference;

means for quantizing the input signal of the block with the number of bits designated by the bit class;

means for selecting a block of the low bit class from the quantized blocks;

allocation means for adding to the selected block of the low bit class data having more bits than the number of bits of the standard bit class of the block of the quantized high bit class to make the number of bits of the block of the low bit class and the number of bits of the block of the high bit class apparently equal to the number of bits of the block of the standard bit class; and means for encoding the quantized block signal.

2. An adaptive transformer encoder according to claim 1 further comprising:

means for recording the encoded signal on a record medium;

means for reading the recorded signal from the record medium; and means for extracting the added high bit class data from the data of the block of the low bit class having the high bit class data added thereto in the signal read by the read means, returning the extracted data to the block of the high bit class and then inverse-transforming the data of the block.

3. An adaptive transform encoder according to claim 2, wherein said allocation means selects the data having more bits than the number of bits of the standard bit class of the quantized high bit class to be added to the block of the low bit class, as bits corresponding to a predetermined high frequency component.

4. An adaptive transform encoder according to claim 2, wherein said comparing and classifying means operates to impart a bit indicating a low class to the block when the block has been classified to the low bit class, and classifies the block to the low bit class in response to the indicating bit.

5. An adaptive transform method for processing continuous digital signals for each fixed block, comprising:

(a) orthogonal-transforming one block of digital input signals;

(b) calculating an activity index of the orthogonal-transformed block;

(c) comparing the activity index of the block with a predetermined reference and (i) classifying the block to a standard bit class having a predetermined number of bits when the activity index of the block is equal to the reference; (ii) classifying the block to at least one low bit class having a smaller number of bits than the predetermined number of bits of the standard bit class when the activity index of the block is smaller than the reference, and (iii) classifying the block to at least one high bit class having a larger number of bits than the predetermined number of bits of the standard bit class when the activity index of the block is larger than the reference;

(d) quantizing the input signal of the block with the number of bits designated by the bit class;

(e) selecting a block of the low bit class from the quantized blocks;

(f) adding to the selected block of the low bit class data having more bits than the number of bits of the standard bit class of the block of the quantized high bit class to make the number of bits of the block of the low bit class and the number of bits of the block of the high bit class apparently equal to the number of bits of the block of the standard bit class; and (g) encoding the quantized block signal.

6. An adaptive transform method according to claim 5, further comprising:

(h) recording the encoded signal on a record medium;

(i) reading the recorded signal from the record medium; and (j) extracting the added high bit class data from the data of the block of the low bit class having the high bit class data added thereto in the recorded signal read during the reading step (i), returning the extracted data to the block of the high bit class and then inverse-transforming the data of the block.

7. An adaptive transform method according to claim 6, wherein said adding step (f) includes selecting data having more bits than the number of bits of the standard bit class of the quantized high bit class to be added to the block of the low bit class, as bits corresponding to a predetermined high frequency component.

8. An adaptive transform method according to claim 6, wherein said block classifying int he step (c) to impart a bit indicating a low class to the block when the block has been classified to the low bit class, and classifies the block to the low bit class in response to the indicating bit.

* * * * *